(12) United States Patent
Sakai et al.

(10) Patent No.: US 8,384,853 B2
(45) Date of Patent: *Feb. 26, 2013

(54) DISPLAY AND VIEWING ANGLE CONTROL ELEMENT USED FOR SAME

(75) Inventors: Takehiko Sakai, Osaka (JP); Dai Chiba, Osaka (JP); Katsuhiko Morishita, Osaka (JP); Yoshiharu Kataoka, Osaka (JP); Chikanori Tsukamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 475 days.

This patent is subject to a terminal disclaimer.

(21) Appl. No.: 12/601,367

(22) PCT Filed: May 20, 2008

(86) PCT No.: PCT/JP2008/059242
§ 371 (c)(1),
(2), (4) Date: Nov. 23, 2009

(87) PCT Pub. No.: WO2008/143256
PCT Pub. Date: Nov. 27, 2008

(65) Prior Publication Data
US 2010/0238376 A1 Sep. 23, 2010

(30) Foreign Application Priority Data
May 21, 2007 (JP) ................. 2007-134428

(51) Int. Cl.
*G02F 1/1347* (2006.01)
*G02F 1/1333* (2006.01)
*G02F 1/1335* (2006.01)
(52) U.S. Cl. ............. 349/74; 349/75; 349/110; 349/122
(58) Field of Classification Search ............... 349/74–75, 349/110, 122
See application file for complete search history.

(56) References Cited

U.S. PATENT DOCUMENTS 8,098,350 B2 * 1/2012 Sakai et al. ............ 349/75
2004/0252258 A1 * 12/2004 Matsushima ............ 349/96
(Continued)

FOREIGN PATENT DOCUMENTS

| GB | 2 405 544 A | 3/2005 |
| JP | 10-268251 | 10/1998 |

(Continued)

OTHER PUBLICATIONS

International Search Report for PCT/JP2008/059242 mailed Aug. 26, 2008.

(Continued)

*Primary Examiner* — Jessica M Merlin
(74) *Attorney, Agent, or Firm* — Nixon & Vanderhye P.C.

(57) ABSTRACT

It is an object to provide a display that can reliably shield visible light in the entire wavelength regions when viewed from an oblique direction and a viewing angle control element used for the display. A viewing angle control liquid crystal panel (2) is comprised of a liquid crystal cell (21) and an emission-side polarizing plate (22). When light having a part of wavelength components (R,G) in the visible wavelength regions enters at least at a predetermined angle, the liquid crystal cell (21) provides the incident light with a phase difference so as to function as a first light-shielding layer that shields the light of the R and G components not to pass through the emission-side polarizing plate (22). A retardation plate (4) and a polarizing plate (5) function as auxiliary light-shielding layers, more specifically, when the light that has passed through the first light-shielding layer enters at least at the predetermined angle, the retardation plate (4) provides the light with a phase difference so that at least light having a wavelength component (B) is shielded and thus not transmitted by the polarizing plate (5).

15 Claims, 3 Drawing Sheets

U.S. PATENT DOCUMENTS

| | | | |
|---|---|---|---|
| 2005/0129918 A1* | 6/2005 | Mac Master | 428/212 |
| 2005/0190329 A1* | 9/2005 | Okumura | 349/123 |
| 2005/0243265 A1* | 11/2005 | Winlow et al. | 349/178 |
| 2006/0103782 A1* | 5/2006 | Adachi et al. | 349/96 |
| 2006/0285040 A1* | 12/2006 | Kobayashi | 349/117 |

FOREIGN PATENT DOCUMENTS

| | | |
|---|---|---|
| JP | 11-7045 | 1/1999 |
| JP | 3322197 | 6/2002 |
| JP | 2005-316470 A | 11/2005 |
| JP | 2006-106439 | 4/2006 |
| JP | 2006-113479 | 4/2006 |
| JP | 2008-20859 | 1/2008 |
| JP | 2006-139160 A | 6/2008 |

OTHER PUBLICATIONS

Japanese Office Action and English translation thereof mailed Feb. 24, 2011 in Japanese application 2009-515247.

* cited by examiner

DISPLAY AND VIEWING ANGLE CONTROL ELEMENT USED FOR SAME

This application is the U.S. national phase of International Application No. PCT/JP2008/059242 filed 20 May 2008 which designated the U.S. and claims priority to Japanese Patent Application No. 2007-134428 filed 21 May 2007, the entire contents of each of which are hereby incorporated by reference.

BACKGROUND AND SUMMARY

The present technology relates to a viewing angle control element capable of switching a viewing angle of a display between a wide viewing angle and a narrow viewing angle, and a display using the viewing angle control element.

It is desirable that a display has a wide viewing angle as much as possible to provide clear images when viewed from any visual angles. In particular, for a liquid crystal display that has been widespread recently, since the liquid crystal itself has a visual angle dependence, various techniques have been developed for the purpose of widening the viewing angle. However, depending on the use environment, a narrow viewing angle is preferred to allow the user alone to visually recognize the displayed contents. In particular, notebook type personal computers, a personal digital assistant (PDA) or mobile phones often are used at a site such as an interior of a train or plane where there are a large number of unidentified persons. In such a use environment, a narrow viewing angle is preferred since it is not desirable from the viewpoint of security protection and privacy protection that a third person in the vicinity looks into the displayed contents. In short, recently, there is an increasing demand for switching the viewing angle of a display between a wide viewing angle and a narrow viewing angle in accordance with the use condition. This demand is not limited to a liquid crystal display, but can be applied commonly to any arbitrary displays.

A technique proposed for coping with such demand is to provide a device for controlling a phase difference in addition to a display device for displaying an image, and to control a voltage to be applied to the device for phase difference control so as to change the viewing angle property (see for example JP 3322197). The Japanese patent of JP 3322197 illustrates a chiral nematic liquid crystal, a homogeneous liquid crystal, a randomly oriented nematic liquid crystal and the like for the liquid crystal mode used in a liquid crystal display device for phase difference control.

It has been disclosed also a configuration for controlling a viewing angle by providing a viewing angle control liquid crystal panel over a display liquid crystal panel, sandwiching these panels with two polarizing plates, and adjusting voltages applied to the viewing angle control liquid crystal panel (see for example, JP H10-268251 A, JP 2005-316470 A). According to JP H10-268251 A, the liquid crystal mode of the viewing angle control liquid crystal panel employs a twist nematic system. JP 2005-316470 A discloses a configuration having a viewing angle control liquid crystal panel provided between two polarizing plates having parallel transmission axes.

The conventional viewing angle control liquid crystal panels as described above respectively control a viewing angle by using the phase difference of the liquid crystal panels. However, since the phase difference occurring in the liquid crystal panels relies on wavelengths, it is difficult to shield simultaneously all of wavelength regions of R (red), G (green) and B (blue) included in the visible light.

Therefore, with the foregoing in mind, it is a feature of the present technology to provide a display that can shield reliably all of the wavelength regions of visible light when viewed in an oblique direction, and a viewing angle control element used for the display.

MEANS FOR SOLVING PROBLEM

For achieving the above, a display according to an example embodiment presented herein includes an image display device that displays an image and a viewing angle control element that is laminated on the image display device and that controls a viewing angle of the image display device. The viewing angle control element includes a first light-shielding layer that comprises an optical element having a birefringence and at least one polarizing plate that comprises an emission-side polarizing plate arranged on an emission side of the optical element. When at least a part of light having a wavelength component in the visible wavelength region enters at least at a predetermined angle, the optical element provides a phase difference so as to shield the light of the wavelength component not to pass through the emission-side polarizing plate. The viewing angle control element includes also at least one auxiliary light-shielding layer that comprises an optical element having a birefringence and at least one polarizing plate that comprises an emission-side polarizing plate arranged on the emission side of the optical element. When the light that has passed through the first light-shielding layer enters at least at the predetermined angle, the optical element provides a phase difference so as to shield at least a part of light having the wavelength component not to pass through the emission-side polarizing plate. At least the wavelength components of the primary colors of light among the light beams entering the viewing angle control element at least at the predetermined angle are shielded by the first light-shielding layer and the auxiliary light-shielding layer.

According to the present embodiment, at least wavelength components of primary colors among light entering a viewing angle control element at least at a predetermined angle are shielded due to a combination of a first light-shielding layer and an auxiliary light-shielding layer, and thus a display capable of shielding reliably the visible light in the entire wavelength regions when viewed in an oblique direction can be provided.

DETAILED DESCRIPTION

A display according to an embodiment includes an image display device that displays an image and a viewing angle control element that is laminated on the image display device and that controls a viewing angle of the image display device. The viewing angle control element includes a first light-shielding layer that comprises an optical element having a birefringence and at least one polarizing plate that comprises an emission-side polarizing plate arranged on an emission side of the optical element. When at least a part of light having a wavelength component in the visible wavelength region enters at least at a predetermined angle, the optical element provides a phase difference so as to shield the light of the wavelength component not to pass through the emission-side polarizing plate. The viewing angle control element includes also at least one auxiliary light-shielding layer that comprises an optical element having a birefringence and at least one polarizing plate that comprises an emission-side polarizing plate arranged on the emission side of the optical element. When the light that has passed through the first light-shielding layer enters at least at the predetermined angle, the optical element provides a phase difference so as to shield at least a part of light having the wavelength component not to pass through the emission-side polarizing plate. At least the wavelength components of the primary colors of light among the light beams entering the viewing angle control element at least at the predetermined angle are shielded by the first light-shielding layer and the auxiliary light-shielding layer.

It is preferable in the display that the first light-shielding layer and the auxiliary light-shielding layer each comprises as the optical element at least one of a liquid crystal panel and a retardation plate.

It is preferable in the display that one of the first light-shielding layer and the auxiliary light-shielding layer shields light in a wavelength region including at least a red wavelength and a green wavelength, and the other of the first light-shielding layer and the auxiliary light-shielding layer shields light in a wavelength region including a blue wavelength. In this case, it can be configured so that one of the first light-shielding layer and the auxiliary light-shielding layer shields light in a wavelength region including a cardinal wavelength, a red wavelength and a green wavelength. According to the former configuration, when a so-called three-wavelength light source is used, leakage light in the oblique direction can be shielded reliably in all wavelength regions. According to the latter configuration, even when a so-called four-wavelength light source is used, leakage light in the oblique direction can be shielded reliably.

The display can be configured so that one of the first light-shielding layer and the auxiliary light-shielding layer shields light in a wavelength region including at least a red wavelength and the other of the first light-shielding layer and the auxiliary light-shielding layer shields light in a wavelength region including a green wavelength and a blue wavelength. In this case, it can be configured so that one of the first light-shielding layer and the auxiliary light-shielding layer shields light in a wavelength region including a cardinal wavelength and the red wavelength.

The display can be configured to include at least two of the above-mentioned auxiliary light-shielding layers. A first layer as any one of the three layers of the first light-shielding layer and the two auxiliary light-shielding layers shields light in the wavelength region including a red wavelength, a second layer as any one of the remaining two layers excepting the first layer shields light in the wavelength region including a green wavelength, and a third layer excepting the first layer and the second layer shields light in the wavelength region including a blue wavelength.

It is preferable in the display that polarizing absorption axes of the polarizing plates arranged to sandwich the optical element of the first light-shielding layer are substantially parallel to each other, and $$n\lambda/2 - \lambda/4 < R < n\lambda/2 + \lambda/4$$

is satisfied when R denotes a retardation of the optical elements of the first light-shielding layer and the auxiliary light-shielding layer, $\lambda$ denotes a wavelength of light shielded by each of the layers, and n denotes an integer not smaller than zero.

Alternatively, it is preferable in the display that polarizing absorption axes of the polarizing plates arranged to sandwich the optical element of the first light-shielding layer cross each other at substantial right angles, and $$n\lambda - \lambda/4 < R < n\lambda + \lambda/4$$

is satisfied when R denotes a retardation of the optical elements of the first light-shielding layer and the auxiliary light-shielding layer, $\lambda$ denotes a wavelength of light shielded by each of the layers, and n denotes an integer not smaller than zero.

The display can be configured so that the image display device is a transmission type liquid crystal display device further provided with a backlight. In this case, the viewing angle control element can be arranged between the backlight and the transmission type liquid crystal display device. Alternatively, the viewing angle control element can be arranged on the front face of the transmission type liquid crystal display device.

The display can be configured so that the image display device is either a reflection type liquid crystal display device or a semi-transmission type liquid crystal display device, and the viewing angle control element is arranged on the front face of the image display device.

Alternatively, the display can be configured so that the image display device is a self-light-emitting display device, and the viewing angle control element is arranged on the front face of the self-light-emitting display device.

Further, for achieving the above, a viewing angle control element according to an embodiment is laminated on an image display device displaying an image and controls a viewing angle of the image display device. The viewing angle control element includes a first light-shielding layer that comprises an optical element having a birefringence and at least one polarizing plate that comprises an emission-side polarizing plate arranged on an emission side of the optical element. When at least a part of light having a wavelength component in the visible wavelength region enters at least at a predetermined angle, the optical element provides a phase difference so as to shield the light of the wavelength component not to pass through the emission-side polarizing plate. The viewing angle control element includes also at least one auxiliary light-shielding layer that comprises an optical element having a birefringence and at least one polarizing plate that comprises an emission-side polarizing plate arranged on the emission side of the optical element. When the light that has passed through the first light-shielding layer enters at least at the predetermined angle, the optical element provides a phase difference so as to shield at least a part of light having the wavelength component not to pass through the emission-side polarizing plate. At least the wavelength components of the primary colors of light among the light beams entering the viewing angle control element at least at the predetermined angle are shielded by the first light-shielding layer and the auxiliary light-shielding layer.

Hereinafter, the present embodiment will be described more specifically with reference to the attached drawings. It should be noted that the respective drawings for reference illustrate in a simple manner only primary members necessary for explaining the present embodiment, among the components in the embodiments presented herein. Therefore, the display according to the present embodiment may include any arbitrary components not illustrated in the respective drawings referred to in the present embodiment. It should be noted further that the dimensions of the members in the respective drawings do not necessarily represent the actual dimensions of the components, the exact dimensional ratios of the respective component and the like.

FIRST EMBODIMENT

Figure 1:
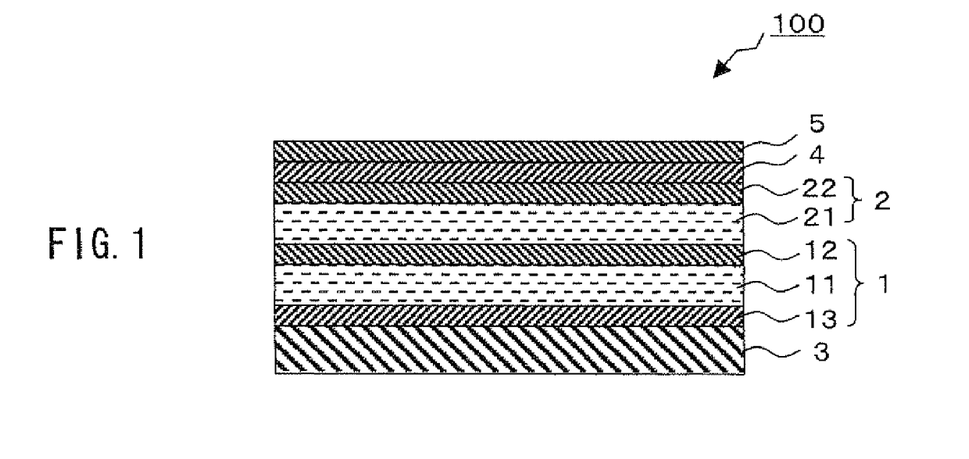
FIG. 1 is a cross-sectional view showing a schematic configuration of a display according to a first embodiment of the present invention.

FIG. 1 is a cross-sectional view showing a schematic configuration of a liquid crystal display 100 according to a first embodiment. As shown in FIG. 1, the liquid crystal display 100 includes two liquid crystal panels consisting of a display liquid crystal panel 1 (display device) for displaying an image and a viewing angle control liquid crystal panel 2 (first light-shielding layer). The display liquid crystal panel 1 is a transmission type, and a backlight 3 using a three-wavelength light source is arranged on its backside. In the liquid crystal display 100 as shown in FIG. 1, the viewing angle control liquid crystal panel 2 is arranged on the front face (observer side) of the display liquid crystal panel 1. The liquid crystal display 100 further has a retardation plate 4 and a polarizing plate 5 both functioning as auxiliary light-shielding layers on the front face of the viewing angle control liquid crystal panel 2.

The liquid crystal display 100 can switch the display condition between a condition where a viewing angle for allowing a visual recognition of an image on the display liquid crystal panel 1 is wide (wide viewing angle) and a condition where the viewing angle is narrow (narrow viewing angle), which is obtained through a switching operation of the liquid crystal in the viewing angle control liquid crystal panel 2. The narrow viewing angle is used particularly favorably when it is undesirable that a third person watches the image on the display liquid crystal panel 1. The wide viewing angle is used favorably for instance in an ordinary use other than the particular case or in a case where a plurality of persons will watch simultaneously the image on the display liquid crystal panel 1.

The display liquid crystal panel 1 includes a liquid crystal cell 11 prepared by sandwiching a liquid crystal between a pair of translucent substrates and also polarizing plates 12, 13 placed on the surface and back face of the liquid crystal cell 11. The liquid crystal mode and the cell structure of the liquid crystal cell 11 can be determined arbitrarily. The drive mode of the display liquid crystal panel 1 also can be determined arbitrarily. That is, for the display liquid crystal panel 1, an arbitrary liquid crystal panel can be used as long as it can display characters, images or moving images. For this reason, the structure of the display liquid crystal panel 1 is not illustrated in detail in FIG. 1, and the explanation is omitted. Further, the display liquid crystal panel 1 can be a panel capable of color display, or it can be a panel only for a monochrome display. Moreover, there is no particular limitation on the structure of the backlight 3, and any known arbitrary backlight can be used. Therefore, detailed illustration and explanation of the structure of the backlight 3 are also omitted.

The viewing angle control liquid crystal panel 2 includes a liquid crystal cell 21 and a polarizing plate 22 laminated on the main surface of the liquid crystal cell 21 opposing the display liquid crystal panel 1. For the liquid crystal cell 21, any liquid crystal cell having an arbitrary liquid crystal mode can be used as long as the liquid crystal cell can provide a narrow viewing angle state for shielding light in a given wavelength range that passes through at a polar angle being larger than a given angle $\phi$ at least at a part of azimuth of 0° to 360° with a combination of the polarizing plate 12 and the polarizing plate 22. The above-described angle $\phi$ can be determined arbitrarily such as 30°, 45° or the like in accordance with the application or the like of the liquid crystal display 100. Here, it is preferable that the above-mentioned "predetermined wavelength range" is a range including peak wavelengths of two colors of the RGB primary colors. In the following description, the liquid crystal cell 21 is configured to shield light in a wavelength range including the G peak wavelength (around 550 nm) and the R peak wavelength (around 650 nm) in the narrow viewing angle state.

In the liquid crystal display 100, the polarizing plates 12, 22, 5 are arranged in a so-called parallel Nicols so that the polarizing-absorption axes coincide with each other. The polarizing plate 13 can be arranged in parallel Nicols or crossed Nicols with respect to the polarizing plate 12 in accordance with the liquid crystal mode of the liquid crystal cell 11 or the properties of the other optical members (for instance, various retardation plates) that may be provided to the display liquid crystal panel 1.

Figure 2:
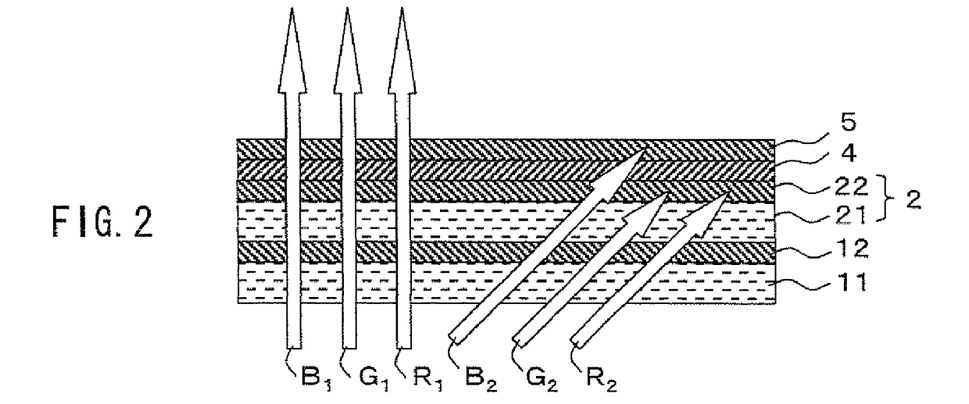
FIG. 2 is a schematic diagram showing optical properties for respective wavelengths in a case where the display according to the first embodiment is in a narrow viewing angle state.

FIG. 2 is a schematic diagram showing the optical properties of the liquid crystal display 100 for the respective wavelengths in a case where the viewing angle control liquid crystal panel 2 is in a narrow viewing angle state. The polarizing plate 13 and the backlight 3 are not shown in FIG. 2. As shown in FIG. 2, when the viewing angle control liquid crystal panel 2 is in a narrow viewing angle state, light beams ($R_1$, $G_1$, $B_1$) of all wavelength components of RGB primary colors pass through in the front direction so as to be recognized visually by the observer. On the other hand, in an oblique direction with a polar angle larger than a predetermined angle, due to the phase difference provided at the liquid crystal cell 21, the light ($R_2$) of the R wavelength component and the light ($G_2$) of the G wavelength component cannot pass through the polarizing plate 22 and they are shielded, while only the light ($B_2$) of the B wavelength component passes through the polarizing plate 22. However, the light beam ($B_2$) of the B wavelength component cannot pass through the polarizing plate 5 and it is shielded due to the phase difference provided at the retardation plate 4. Thereby, when the viewing angle control liquid crystal panel 2 is set to a narrow viewing angle state, light beams ($R_2$, $G_2$, $B_2$) of all wavelength components of RGB primary colors are shielded in the oblique direction, and thus the light beams are not recognized visually by the observer. As a result, when the viewing angle control liquid crystal panel 2 is set to a narrow viewing angle state, peeping in the oblique direction can be prevented reliably.

For providing the above-mentioned optical properties, the conditions (1)-(4) below should be satisfied when the viewing angle control liquid crystal panel 2 is set to a narrow viewing angle state. Here, as mentioned above, the polarizing plates 12, 22, 5 are arranged in a so-called parallel Nicols so that the polarizing-absorption axes coincide with each other.

(1) The behavior of the liquid crystal molecules in the liquid crystal cell 21 is controlled so that the retardation values $R_{LCDR0}$, $R_{LCDG0}$, $R_{LCDB0}$ of the liquid crystal cell 21 regarding the R peak wavelength $\lambda_R$ (about 650 nm), the G peak wavelength $\lambda_G$ (about 550 nm) and the B peak wavelength $\lambda_B$ (about 450 nm) with respect to the front direction (polar angle $\phi=0°$) satisfy respectively the conditional formulae (f1)-(f3) below when n in each formula is an integer not smaller than zero. In the conditional formulae (f1)-(f3) and any of conditional formulae below, n can be the identical value or values different from each other.

$$n\lambda_R - \lambda_R/4 < R_{LCDR0} < n\lambda_R + \lambda_R/4 \quad (f1)$$

$$n\lambda_G - \lambda_G/4 < R_{LCDG0} < n\lambda_G + \lambda_G/4 \quad (f2)$$

$$n\lambda_B - \lambda_B/4 < R_{LCDB0} < n\lambda_B + \lambda_B/4 \quad (f3)$$

Namely, if the conditions of the above (f1)-(f3) are satisfied, the vibration plane of the linearly-polarized light that enters the liquid crystal cell 21 through the polarizing plate 12 rotates by about 180° at the time of passing through the liquid crystal cell 21, and thus the linearly-polarized light can pass through the polarizing plate 22.

(2) The retardation values $R_{POLR0}$, $R_{POLG0}$, $R_{POLB0}$ of the retardation plate 4 regarding the R peak wavelength $\lambda_R$, G peak wavelength $\lambda_G$, and B peak wavelength $\lambda_B$ with respect to the front direction (polar angle $\phi=0°$) satisfy respectively the conditional formulae (f4)-(f6) below when n in each formula is an integer not smaller than zero. The retardation values of the retardation plate 4 are determined depending on the three-dimensional refractive index (nx, ny, nz) of the retardation plate 4 and the thickness (d) of the retardation plate 4.

$$n\lambda_R - \lambda_R/4 < R_{POLR0} < n\lambda_R + \lambda_R/4 \quad (f4)$$

$$n\lambda_G - \lambda_G/4 < R_{POLG0} < n\lambda_G + \lambda_G/4 \quad (f5)$$

$$n\lambda_B - \lambda_B/4 < R_{POLB0} < n\lambda_B + \lambda_B/4 \quad (f6)$$

(3) The behavior of the liquid crystal molecules in the liquid crystal cell 21 is controlled so that the retardation values $R_{LCDR}\theta$, $R_{LCDG}\theta$ of the liquid crystal cell 21 regarding the R peak wavelength $\lambda_R$ and the G peak wavelength $\lambda_G$ with respect to the oblique direction (polar angle $\phi=\theta$) satisfy respectively the conditional formulae (f7), (f8) below.

$$n\lambda_R/2 - \lambda_R/4 < R_{LCDR}\theta < n\lambda_R/2 + \lambda_R/4 \quad (f7)$$

$$n\lambda_G/2 - \lambda_G/4 < R_{LCDG}\theta < n\lambda_G/2 + \lambda_G/4 \quad (f8)$$

If the conditions of the above (f7) and (f8) are satisfied, the vibration plane of the linearly-polarized light that enters the liquid crystal cell 21 through the polarizing plate 12 rotates by about 90° at the time of passing through the liquid crystal cell 21, and thus the linearly-polarized light cannot pass through the polarizing plate 22.

The retardation value $R_{POLB}\theta$ of the retardation plate 4 regarding the B peak wavelength $\lambda_B$ with respect to the oblique direction (polar angle $\phi=\theta$) satisfies the conditional formula (f9) below.

$$n\lambda_B/2 - \lambda_B/4 < R_{POLB}\theta < n\lambda_B/2 + \lambda_B/4 \quad (f9)$$

If the condition of the above (f9) is satisfied, the vibration plane of the linearly-polarized light that enters the retardation plate 4 through the polarizing plate 22 rotates by about 90° at the time of passing through the retardation plate 4, and thus the linearly-polarized light cannot pass through the polarizing plate 5. In this manner, the leakage light of the B wavelength component that has not been shielded by the viewing angle control liquid crystal panel 2 can be shielded by the combination of the retardation plate 4 and the polarizing plate 5.

When the polarizing plate 22 is arranged in crossed Nicols with respect to the polarizing plate 12, the respective terms of $n\lambda_R$, $n\lambda_B$, $n\lambda_G$ in the above-described formulae (f1)-(f3) can be substituted by $n\lambda_R/2$, $n\lambda_B/2$, $n\lambda_G/2$, and at the same time, the respective terms of $n\lambda_R/2$, $n\lambda_B/2$, $n\lambda_G/2$ in the formulae (f7), (f8) can be substituted by $n\lambda_R$, $n\lambda_B$, $n\lambda_G$.

When the polarizing plate 5 is arranged in crossed Nicols with respect to the polarizing plate 22, the respective terms of $n\lambda_R$, $n\lambda_B$, $n\lambda_G$ in the above-described formulae (f4)-(f6) can be substituted by $n\lambda_R/2$, $n\lambda_B/2$, $n\lambda_G/2$, and at the same time, the term of $n\lambda_B/2$ in the formula of (f9) can be substituted by $n\lambda_B$.

For obtaining a further favorable narrow viewing angle property, it is preferable to set the respective terms of $\lambda_R/4$, $\lambda_B/4$, $\lambda_G/4$ in the above formulae (f7)-(f9) to $\lambda_R/8$, $\lambda_B/8$, $\lambda_G/8$ for instance, or to values closer to zero.

For the retardation plate 4, for instance, a negative C plate (nx=ny>nz) can be used. In this case, for instance, it is possible to prevent light in a wavelength range including the B peak wavelength with respect to the polar angle $\phi=45°$ from passing through the polarizing plate 5, by setting the retardation value of the negative C plate (retardation plate 4) with respect to the polar angle to approximately $\lambda_B/2$ ($\lambda_B=450$ nm).

As mentioned above, with the liquid crystal display 100 according to the present embodiment, leakage light of a blue component that cannot be shielded completely by the viewing angle control liquid crystal panel 2 can be shielded reliably by the combination of the retardation plate 4 and the polarizing plate 5, when the viewing angle control liquid crystal panel 2 is set to a narrow viewing angle state. Accordingly, all of the RGB components of light outgoing in the oblique direction can be shielded. As a result, a narrow viewing angle state where the content displayed on the display liquid crystal panel 1 cannot be seen from the visual angle in the oblique direction can be provided.

In the configuration explained above, the viewing angle control liquid crystal panel 2 in a narrow viewing angle state shields light in a wavelength range including the G peak wavelength (around 550 nm) and the R peak wavelength (around 650 nm), and the retardation plate 4 combined with the polarizing plate 5 shields the B peak wavelength (around 450 nm) in the oblique direction. It should be noted, however, that the embodiments of the present invention are not limited to this configuration, but variations as described below can be employed.

Alternatively for instance, in a narrow viewing angle condition, the viewing angle control liquid crystal panel 2 shields light in a wavelength range including the B peak wavelength (around 450 nm) and the G peak wavelength (around 550 nm), and the retardation plate 4 combined with the polarizing plate 5 shields the R peak wavelength (around 650 nm) in the oblique direction.

In the above explanation, a backlight using a three-wavelength light source is referred to as the backlight 3. The present invention can be applied also to a case of using a four-wavelength light source having a peak wavelength around 700 nm (cardinal) in addition to the primary colors of RGB. In such a case, the viewing angle control liquid crystal panel 2 shields light in the wavelength range including the G peak wavelength (around 550 nm), the R peak wavelength (around 650 nm) and the cardinal peak wavelength (around 700 nm) in the oblique direction, and the retardation plate 4 combined with the polarizing plate 5 shields the B peak wavelength (around 450 nm) in the oblique direction. Alternatively, the viewing angle control liquid crystal panel 2 shields light in the wavelength range including the R peak wavelength and the cardinal peak wavelength in the oblique direction, and the retardation plate 4 combined with the polarizing plate 5 shields the wavelength component around the G peak wavelength and the wavelength component around the B peak wavelength in the oblique direction. Further at this time, the wavelength component around the G peak wavelength and the wavelength component around the B peak wavelength can be shielded by the retardation plate 4 and an additional retardation plate.

The light source for the backlight 3 is not limited to the three-wavelength light source or the four-wavelength light source. Namely, in a case where a light source having a luminance peak at a particular wavelength is used for the backlight, factors such as the retardations of the liquid crystal cell 21 and the retardation plate 4 and the number of the retardation plates can be set appropriately in accordance with the value of the wavelength and the number of the luminance peaks.

The present embodiment refers to an example of a configuration of using the retardation plate 4 for shielding the wavelength components that cannot be shielded completely with the viewing angle control liquid crystal panel 2. The retardation plate 4 can be replaced by a liquid crystal cell having a retardation substantially equivalent to that of the retardation plate 4.

Figure 3:
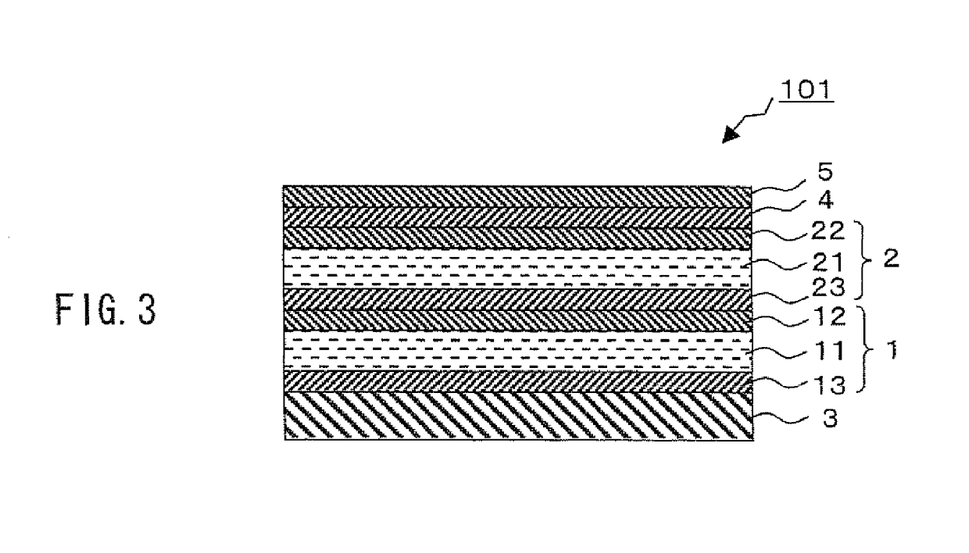
FIG. 3 is a cross-sectional view showing a schematic configuration of a variation of the display according to the first embodiment.

The present embodiment refers to an example of a configuration that the polarizing plate 12 functions as an emission-side polarizing plate of the display liquid crystal panel 1 and an incident side polarizing plate of the viewing angle control liquid crystal panel 2, as shown in FIG. 1. However, as shown in FIG. 3, other embodiments include also a liquid crystal display 101 further including on the polarizing plate 12 a polarizing plate 23 as an incident side polarizing plate of the viewing angle control liquid crystal panel 2. On the other hand, the liquid crystal display 100 shown in FIG. 1 is advantageous over the liquid crystal display 101 shown in FIG. 3 in that the number of the polarizing plates can be reduced.

Figure 4:
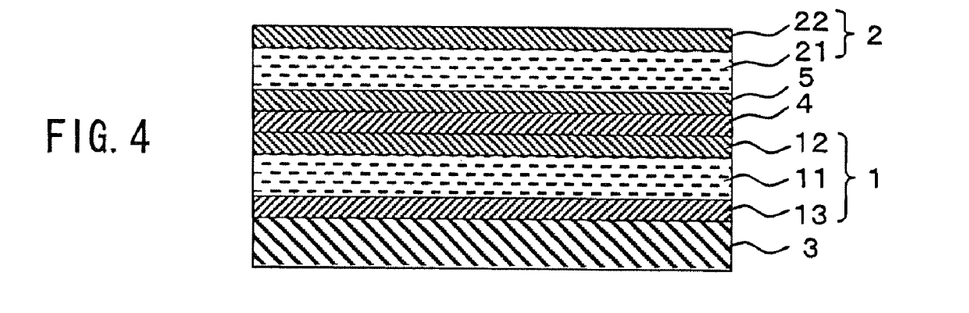
FIG. 4 is a cross-sectional view showing a schematic configuration of a variation of the display according to the first embodiment.

Further, the present embodiment refers to an example of a configuration that the viewing angle control liquid crystal panel 2 for shielding the RG components is arranged closer to the display liquid crystal panel 1, and the retardation plate 4 and the polarizing plate 5 are arranged on the front face (observer side). However, the order for laminating the liquid crystal panels and the retardation plates for shielding the respective color components can be determined arbitrarily. For instance, as shown in FIG. 4, the order for laminating the retardation plate 4 and the polarizing plate 5 with respect to the viewing angle control liquid crystal panel 2 can be inversed to the configuration shown in FIG. 1.

SECOND EMBODIMENT

A second embodiment will be described below. Components functioning analogously to the components described in the first embodiment are assigned with identical reference numerals in order to avoid the duplication of explanations.

Figure 5:
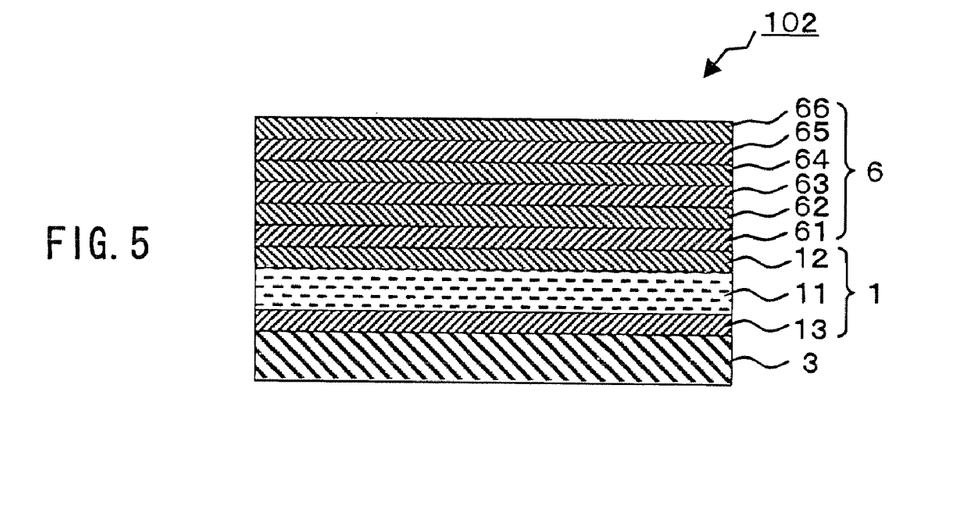
FIG. 5 is a cross-sectional view showing a schematic configuration of a display according to a second embodiment of the present invention.

FIG. 5 is a cross-sectional view showing a schematic configuration of a liquid crystal display 102 according to the second embodiment. As shown in FIG. 5, the liquid crystal display 102 has a viewing angle control film 6 in place of the viewing angle control liquid crystal panel 2 on the front face (observer side) of the display liquid crystal panel 1.

The viewing angle control film 6 is composed of a retardation plate 61, a polarizing plate 62, a retardation plate 63, a polarizing plate 64, a retardation plate 65 and a polarizing plate 66.

In the liquid crystal display 102, the polarizing plates 12, 62, 64, 66 are arranged in so-called parallel Nicols so that their polarizing-absorption axes coincide with each other. The polarizing plate 13 can be arranged in parallel Nicols or crossed Nicols with respect to the polarizing plate 12 in accordance with the liquid crystal mode of the liquid crystal cell 11 and/or the properties of the other optical components (for instance, various retardation plates) that may be provided to the display liquid crystal panel 1.

Figure 6:
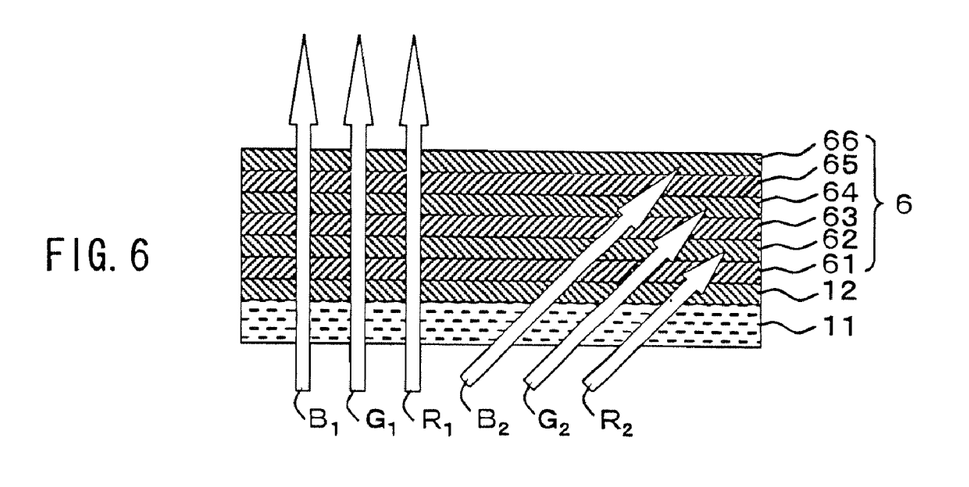
FIG. 6 is a schematic diagram showing optical properties for respective wavelengths of the display according to the second embodiment.

FIG. 6 is a schematic diagram showing the optical properties of the liquid crystal display 102 for the respective wavelengths. The polarizing plate 13 and the backlight 3 are not shown in FIG. 6. As shown in FIG. 6, in the liquid crystal display 102, light beams ($R_1$, $G_1$, $B_1$) of all wavelength components of RGB primary colors pass through in the front direction so as to be recognized visually by the observer. On the other hand, in an oblique direction with a polar angle larger than a predetermined angle, due to the phase difference provided at the retardation plate 61, the light ($R_2$) of the R wavelength component cannot pass through the polarizing plate 62, and it is shielded. The light ($G_2$) of the G wavelength component and the light ($B_2$) of the B wavelength component pass through the polarizing plate 62, but due to the phase difference provided at the retardation plate 63, the light ($G_2$) of the G wavelength component cannot pass through the polarizing plate 64 and is shielded. The light ($B_2$) of the B wavelength component passes through the polarizing plate 64, but due to the phase difference provided at the retardation plate 65, it cannot pass through the polarizing plate 66 and is shielded. Namely, in the configuration shown in FIG. 6, the combination of the retardation plate 61 and the polarizing plate 62 functions as a first light-shielding layer, and the combination of the retardation plate 63 and the polarizing plate 64 and also the combination of the retardation plate 65 and the polarizing plate 66 function respectively as auxiliary light-shielding layers. Due to this configuration, in the oblique direction, the light beams ($R_2$, $G_2$, $B_2$) of all of the wavelength components of RGB primary colors are shielded, and thus the light beams are not recognized visually by the observer. As a result, the liquid crystal display 102 can prevent reliably peeping in the oblique direction.

For providing the above-mentioned optical properties, the conditions (1)-(6) below should be satisfied. Here, as mentioned above, the polarizing plates 12, 62, 64 and 66 are arranged in a so-called parallel Nicols so that the polarizing-absorption axes coincide with each other.

(1) The retardation values $R_{POL61R0}$, $R_{POL61G0}$, $R_{POL61B0}$ of the retardation plate 61 regarding the R peak wavelength $\lambda_R$, the G peak wavelength $\lambda_G$ and the B peak wavelength $\lambda_B$ with respect to the front direction (polar angle $\phi=0°$) satisfy respectively the conditional formulae (f10)-(f12) when n in each formula is an integer not smaller than zero. The retardation values of the retardation plate 61 are determined depending on the three-dimensional refractive index (nx, ny, nz) of the retardation plate 61 and the thickness (d) of the retardation plate 61.

$$n\lambda_R - \lambda_R/4 < R_{POL61R0} < n\lambda_R + \lambda_R/4 \qquad (f10)$$

$$n\lambda_G - \lambda_G/4 < R_{POL61G0} < n\lambda_G + \lambda_G/4 \qquad (f11)$$

$$n\lambda_B - \lambda_B/4 < R_{POL61B0} < n\lambda_B + \lambda_B/4 \qquad (f12)$$

(2) The retardation values $R_{POL63R0}$, $R_{POL63G0}$, $R_{POL63B0}$ of the retardation plate 63 regarding the R peak wavelength $\lambda_R$, G peak wavelength $\lambda_G$, and B peak wavelength $\lambda_B$ with respect to the front direction (polar angle $\phi=0°$) satisfy respectively the conditional formulae (f13)-(f15) below when n in each formula is an integer not smaller than zero.

$$n\lambda_R - \lambda_R/4 < R_{POL63R0} < n\lambda_R + \lambda_R/4 \quad \text{(f13)}$$

$$n\lambda_G - \lambda_G/4 < R_{POL63G0} < n\lambda_G + \lambda_G/4 \quad \text{(f14)}$$

$$n\lambda_B - \lambda_B/4 < R_{POL63B0} < n\lambda_B + \lambda_B/4 \quad \text{(f15)}$$

(3) The retardation values $R_{POL65R0}$, $R_{POL65G0}$, $R_{POL65B0}$ of the retardation plate 65 regarding the R peak wavelength $\lambda_R$, the G peak wavelength $\lambda_G$, and the B peak wavelength $\lambda_B$ with respect to the front direction (polar angle $\phi=0°$) satisfy respectively the conditional formulae (f16)-(f18) below when n in each formula is an integer not smaller than zero.

$$n\lambda_R - \lambda_R/4 < R_{POL65R0} < n\lambda_R + \lambda_R/4 \quad \text{(f16)}$$

$$n\lambda_G - \lambda_G/4 < R_{POL65G0} < n\lambda_G + \lambda_G/4 \quad \text{(f17)}$$

$$n\lambda_B - \lambda_B/4 < R_{POL65B0} < n\lambda_B + \lambda_B/4 \quad \text{(f18)}$$

(4) The retardation value $R_{POL61R}$ of the retardation plate 61 regarding the R peak wavelength $\lambda_R$ with respect to the oblique direction (polar angle $\phi=\theta$) satisfies the conditional formula (f19) below when n in the formula is an integer not smaller than zero.

$$n\lambda_R/2 - \lambda_R/4 < R_{POL61R}\theta < n\lambda_R/2 + \lambda_R/4 \quad \text{(f19)}$$

(5) The retardation value $R_{POL63G}$ of the retardation plate 63 regarding the G peak wavelength $\lambda_G$ with respect to the oblique direction (polar angle $\phi=\theta$) satisfies the conditional formula (f20) below when n in the formula is an integer not smaller than zero.

$$n\lambda_G/2 - \lambda_G/4 < R_{POL63G}\theta < n\lambda_G/2 + \lambda_G/4 \quad \text{(f20)}$$

(6) The retardation value $R_{POL65B}$ of the retardation plate 65 regarding the B peak wavelength $\lambda_B$ with respect to the oblique direction (polar angle $\phi=\theta$) satisfies the conditional formula (f21) below when n in the formula is an integer not smaller than zero.

$$n\lambda_B/2 - \lambda_B/4 < R_{POL65B}\theta < n\lambda_B/2 + \lambda_B/4 \quad \text{(f21)}$$

When the above conditions (f19)-(f21) are satisfied, the wavelength components of R, G and B are in the oblique direction shielded respectively by the polarizing plates 62, 64 and 66. Thereby, it is possible to provide a narrow viewing angle state where the content displayed on the display liquid crystal panel 1 cannot be recognized visually when viewed from the oblique direction.

When the polarizing plate 62 is arranged in crossed Nicols with respect to the polarizing plate 12, the respective terms of $n\lambda_R$, $n\lambda_B$, $n\lambda_G$ in the above-described formulae (f10)-(f12) can be substituted by $n\lambda_R/2$, $n\lambda_B/2$, $n\lambda_G/2$, and at the same time, the term of $n\lambda_R/2$ in the formula (f19) can be substituted by $n\lambda_R$.

When the polarizing plate 64 is arranged in crossed Nicols with respect to the polarizing plate 62, the respective terms of $n\lambda_R$, $n\lambda_B$, $n\lambda_G$ in the above-described formulae (f13)-(f15) can be substituted by $n\lambda_R/2$, $n\lambda_B/2$, $n\lambda_G/2$, and at the same time, the term of $n\lambda_G/2$ in the formula (f20) can be substituted by $n\lambda_G$.

And when the polarizing plate 66 is arranged in crossed Nicols with respect to the polarizing plate 64, the respective terms of $n\lambda_R$, $n\lambda_B$, $n\lambda_G$ in the above-described formulae (f16)-(f18) can be substituted by $n\lambda_R/2$, $n\lambda_B/2$, $n\lambda_G/2$, and at the same time, the term of $n\lambda_B/2$ in the formula (f21) can be substituted by $n\lambda_B$.

For obtaining further desirable narrow viewing angle properties, it is preferred to set the respective terms of $\lambda_R/4$, $\lambda_B/4$ and $\lambda_G/4$ in the above-described formulae (f19)-(f21) to $\lambda_R/8$, $\lambda_B/8$ and $\lambda_G/8$ for instance, or small values closer to zero.

For the retardation plates 61, 63 and 65, for instance a negative C plate (nx=ny>nz) can be used. In this case, for instance, for preventing light in a wavelength range including the R peak wavelength with respect to the polar angle $\phi=45°$ from passing through the polarizing plate 62, the retardation value of the negative C plate (retardation plate 61) with respect to the polar angle will be set to approximately $\lambda_R/2$ ($\lambda_R$=650 nm). For preventing light in a wavelength range including the G peak wavelength with respect to the polar angle $\phi=45°$ from passing through the polarizing plate 64, the retardation value of the negative C plate (retardation plate 63) with respect to the polar angle will be set to approximately $\lambda_G/2$ ($\lambda_G$=550 nm). And for preventing light in a wavelength range including the B peak wavelength with respect to the polar angle $\phi=45°$ from passing through the polarizing plate 66, the retardation value of the negative C plate (retardation plate 65) with respect to the polar angle will be set to approximately $\lambda_B/2$ ($\lambda_B$=450 nm).

As mentioned above, the liquid crystal display 100 according to the present embodiment can shield reliably all of the wavelength components of RGB with respect to the viewing angle in the oblique direction. Thereby, it is possible to provide a narrow viewing angle state where the content displayed on the display liquid crystal panel 1 cannot be recognized at all when viewed at a visual angle in the oblique direction.

Similarly to the first embodiment, it is possible in the present embodiment to use a backlight having a four-wavelength light source or any other arbitrary light source in place of the three-wavelength light source, for the backlight 3.

Furthermore, although in the present embodiment refers to a configuration using the retardation plates 61, 63 and 65 for shielding the respective wavelength components, at least one of these retardation plates can be replaced by a liquid crystal cell having a retardation substantially equivalent to that of the retardation plate. Namely, in a configuration using the retardation plates 61, 63 and 65, it is impossible to switch between a wide viewing angle state and a narrow viewing angle state. In contrast, when the liquid crystal cell is used in place of any of these retardation plates, it is possible to switch dynamically between the wide viewing angle state and the narrow viewing angle state by switching the drive voltage of the liquid crystal cell.

Further, the present embodiment refers to a configuration that the polarizing plate 12 functions as an emission-side polarizing plate of the display liquid crystal panel 1 and also as an incident side polarizing plate of the display liquid crystal panel 2, as shown in FIG. 6. However, similarly to the case of the liquid crystal display 101 according to the first embodiment as shown in FIG. 3, it is possible also to provide further a polarizing plate 23 on the polarizing plate 12, as an incident side polarizing plate of the viewing angle control liquid crystal panel 2.

Furthermore according to the configuration of the present embodiment, the retardation plate 61 laminated the closest to the display liquid crystal panel 1, which is combined with the polarizing plate 62, shields the R wavelength component. The retardation plate 63 laminated thereon, which is combined with the polarizing plate 64, shields the G wavelength component. And, the retardation plate 65 laminated the closest to the observer, which is combined with the polarizing plate 66, shields the B wavelength component. However, the order for laminating the retardation plates that shield the respective color components is determined arbitrarily.

The present embodiment is not limited to the specific examples explained above, but several variations can be employed within the scope of the present embodiment.

For example, each of the first and second embodiments refers to a configuration having a viewing angle control element on only one of the front face or the back face of the display liquid crystal panel 1. However, the viewing angle control element can be provided on both of the front face and the back face of the display liquid crystal panel 1. Alternatively, for shielding a wider range in the narrow viewing angle state, a plurality of viewing angle control elements can be laminated with varied directions, for instance.

Figure 7:
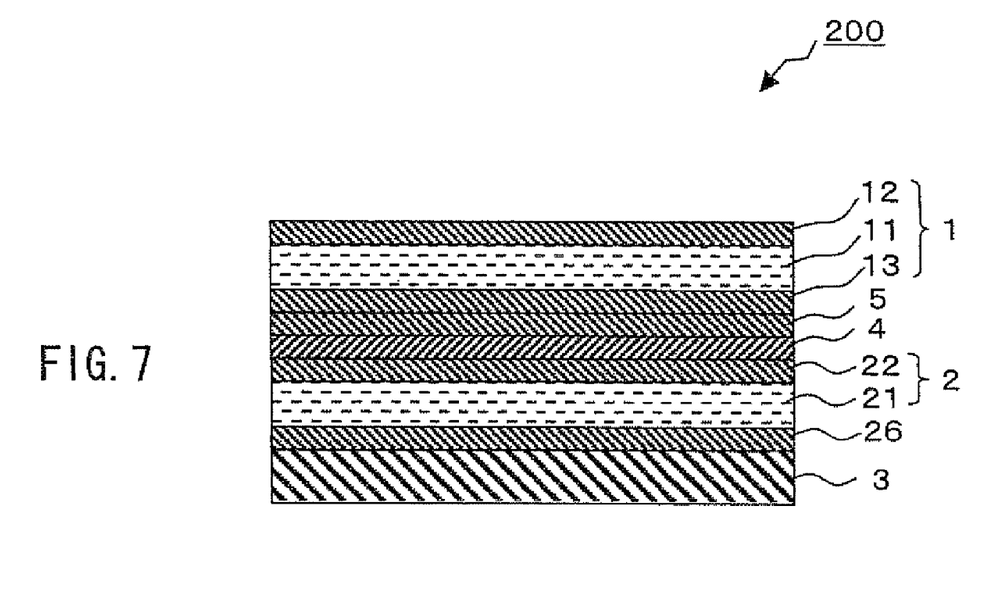
FIG. 7 is a cross-sectional view showing a schematic configuration of a variation of the display according to the first embodiment.

Alternatively for instance, FIG. 7 shows a configuration of a liquid crystal display 200 as a variation of the liquid crystal display 100 according to the first embodiment. As it is clearly shown from the comparison between FIG. 1 and FIG. 7, the liquid crystal display 100 and the liquid crystal display 200 are inverse each other in the lamination order. Namely, as shown in FIG. 7, the liquid crystal display 200 is formed by arranging a viewing angle control liquid crystal panel 2 between the backlight 3 and the display liquid crystal panel 1. In the liquid crystal display 200, the display liquid crystal panel 1 can be a semi-transmission type liquid crystal panel.

The liquid crystal display 200 has a linearly-polarizing plate 26 arranged between the backlight 3 and the viewing angle control liquid crystal panel 2. Namely, in a case of the liquid crystal display 100 as shown in FIG. 1, the polarizing plate 12 of the display liquid crystal panel 1 functions as a polarizing plate provided at the side for the light to enter the viewing angle control liquid crystal panel 2. In contrast, in a case of the liquid crystal display 200 as shown in FIG. 7, it is required to provide a linearly-polarizing plate at the backlight 3 side. However, in the liquid crystal display 200 as shown in FIG. 7, the polarizing plate 13 as the incident side polarizing plate of the display liquid crystal panel 1 can be omitted. In the liquid crystal display 200 as shown in FIG. 7, the set of the viewing angle control liquid crystal panel 2, the retardation plate 4 and the polarizing plate 5 can be replaced by the viewing angle control film 6 according to the second embodiment.

The image display device is not limited to the above-described transmission type liquid crystal panel as a specific example of the image display device. Alternatively for instance, a reflection type or a semi-transmission type liquid crystal display panel can be used for the image display device. Further, the present invention is not limited to the non-luminescent display device like a liquid crystal display device, but self-light-emitting display devices such as CRT (Cathode Ray Tube), a plasma display, an organic EL (Electronic Luminescence) device, an inorganic EL device, a LED (Light Emitting Diode) display, a vacuum fluorescent display, a field emission display, and a surface-conduction electron-emitter display can be used similarly.

In the above-described first embodiment, when the display is in the displaying state of a narrow viewing angle, it is also possible to display on the screen of the display device, a message, an image, an icon or the like to inform the user about the displaying state.

Furthermore in the first embodiment, it is also possible to automatically switch between a narrow viewing angle and a wide viewing angle by operating the drive circuit of the viewing angle control device in accordance with the contents of the image displayed by the display device. For instance, when the display is used to see a web page of internet, or when referring to the software flag related to the respective pages in accordance with the contents of the web page and when it is preferable that the content is not observed by a third person, the display can be switched automatically to a displaying state with a narrow viewing angle. It is also possible to switch to a displaying state with a narrow viewing angle when the browser is activated in an encryption mode.

It is also possible to control to switch the displaying state of the display to a narrow viewing angle state, for instance when the display is a part of the data entry device, or when the display relates to the data entry device and the data type inputted or the data type to be inputted are confidential. For instance, when the user inputs a kind of personal identification number or the like, the displaying state will be switched automatically to have a narrow viewing angle.

Alternatively in the above-described first embodiment, the viewing angle control device can be formed as a module or a cover detachable from the image display device. When such a detachable module is attached to an image display device, an appropriate electric power and a control signal can be obtained by the electric connection to the image display device.

It is also preferable in the first embodiment that an optical sensor (ambient sensor) for measuring the ambient light of the display is provided further, and when the value measured with the optical sensor is lower than a predetermined threshold value, the displaying state of the display is set to a narrow viewing angle.

The liquid crystal display 102 according to the second embodiment is set normally to a narrow viewing angle state, and thus unlike the liquid crystal display in the first embodiment, it is impossible to switch between a wide viewing angle state and a narrow viewing angle state. However, this liquid crystal display has several advantages over the counterpart of the first embodiment, for instance, the structure of the device is simple, the entire display device can be formed to be thin and light-weight, and the transmissivity is high. Therefore, it is preferred to apply the first embodiment and the second embodiment properly to the purposes.

For instance, in a case of a display device such as a mobile phone or a mobile PC where it is desirable to switch between the wide viewing angle and the narrow viewing angle in use in accordance with the ambient conditions, the first embodiment will be applied preferably. On the other hand, the second embodiment will be applied to a display device such as a display panel for an automated teller machine (ATM), which should be protected from peeping of a third person from behind in the oblique direction. In a case of a monitor carried on a vehicle, the second embodiment can be employed to prevent projection of a monitor screen on a windshield or on the side windows. The application of the viewing angle control film 6 as explained in the second embodiment is not limited to a display device. For instance, it can be stuck to various articles such as windowpanes of vehicles and buildings and partitions so as to shield peeping from outside.

The display and the viewing angle control element according to the present embodiments have a multitude of applications. For instance, they can be applied to displays for a notebook personal computer, a personal digital assistant (PDA), a portable game machine, or a mobile phone. In addition to that, the display and the viewing angle control element according to the present embodiment can be applied to displays of various apparatuses such as ATM, information terminals installed in a public place, a ticket machine, and a display to be carried on a vehicle.

Further, the viewing angle control element according to the present embodiment may be provided in a state assembled in a display. Alternatively, it may be produced as an independent viewing angle control element and distributed as a member for a display.

The present embodiments can be used industrially as a display that can switch between a wide viewing angle and a narrow viewing angle so as to be applied to various use environments and purposes and also a viewing angle control element used therefor.

The invention claimed is:

1. A display comprising an image display device that displays an image and a viewing angle control element that is laminated on the image display device and that controls a viewing angle of the image display device, the viewing angle control element comprises:

a first light-shielding layer that comprises an optical element having a birefringence and at least one polarizing plate that comprises an emission-side polarizing plate arranged on an emission side of the optical element, and when light having wavelength components in the visible wavelength region, including at least a part of light having a first wavelength component in the visible wavelength region, enters at least at a predetermined angle, the optical element provides a phase difference so as to shield the light of the first wavelength component so as not to pass through the emission-side polarizing plate, and at least one auxiliary light-shielding layer that comprises an optical element having a birefringence and at least one polarizing plate that comprises an emission-side polarizing plate arranged on the emission side of the optical element, and when the remaining light having wavelength components in the visible wavelength region not including the first wavelength component that has passed through the first light-shielding layer enters at least at the predetermined angle, the optical element provides a phase difference so as to shield at least the remaining light so as not to pass through the emission-side polarizing plate;

at least the wavelength components of the primary colors of light among the light beams entering the viewing angle control element at least at the predetermined angle are shielded by the first light-shielding layer and the auxiliary light-shielding layer.

2. The display according to claim 1, wherein
the first light-shielding layer and the auxiliary light-shielding layer each comprises as the optical element at least one of a liquid crystal panel and a retardation plate.

3. The display according to claim 1, wherein
one of the first light-shielding layer and the auxiliary light-shielding layer shields light in a wavelength region including at least a red wavelength and a green wavelength, and the other of the first light-shielding layer and the auxiliary light-shielding layer shields light in a wavelength region including a blue wavelength.

4. The display according to claim 3, wherein
one of the first light-shielding layer and the auxiliary light-shielding layer shields light in a wavelength region including a cardinal wavelength, a red wavelength and a green wavelength.

5. The display according to claim 1, wherein
one of the first light-shielding layer and the auxiliary light-shielding layer shields light in a wavelength region including at least a red wavelength and the other of the first light-shielding layer and the auxiliary light-shielding layer shields light in a wavelength region including a green wavelength and a blue wavelength.

6. The display according to claim 5, wherein
one of the first light-shielding layer and the auxiliary light-shielding layer shields light in a wavelength region including a cardinal wavelength and the red wavelength.

7. The display according to claim 1, comprising at least two of the auxiliary light-shielding layers, wherein
a first layer as any one of the three layers of the first light-shielding layer and the two auxiliary light-shielding layers shields light in the wavelength region including a red wavelength, a second layer as any one of the remaining two layers excepting the first layer shields light in the wavelength region including a green wavelength, and a third layer excepting the first layer and the second layer shields light in the wavelength region including a blue wavelength.

8. The display according to claim 1, wherein
polarizing absorption axes of the polarizing plates arranged to sandwich the optical element of the first light-shielding layer are substantially parallel to each other, and $$n\lambda/2 - \lambda/4 < R < n\lambda/2 + \lambda/4$$

is satisfied when R denotes a retardation of the optical elements of the first light-shielding layer and the auxiliary light-shielding layer, $\lambda$ denotes a wavelength of light shielded by each of the layers, and n denotes an integer not smaller than zero.

9. The display according to claim 1, wherein
polarizing absorption axes of the polarizing plates arranged to sandwich the optical element of the first light-shielding layer cross each other at substantial right angles, and $$n\lambda - \lambda/4 < R < n\lambda + \lambda/4$$

is satisfied when R denotes a retardation of the optical elements of the first light-shielding layer and the auxiliary light-shielding layer, $\lambda$ denotes a wavelength of light shielded by each of the layers, and n denotes an integer not smaller than zero.

10. The display according to claim 1, wherein
the image display device is a transmission type liquid crystal display device further provided with a backlight.

11. The display according to claim 10, wherein
the viewing angle control element is arranged between the backlight and the transmission type liquid crystal display device.

12. The display according to claim 10, wherein
the viewing angle control element is arranged on the front face of the transmission type liquid crystal display device.

13. The display according to claim 1, wherein
the image display device is either a reflection type liquid crystal display device or a semi-transmission type liquid crystal display device, and the viewing angle control element is arranged on the front face of the image display device.

14. The display according to claim 1, wherein
the image display device is a self-light-emitting display device, and the viewing angle control element is arranged on the front face of the self-light-emitting display device.

15. A viewing angle control element that is laminated on an image display device displaying an image and that controls a viewing angle of the image display device, the viewing angle control element comprising:

a first light-shielding layer that comprises an optical element having a birefringence and at least one polarizing plate that comprises an emission-side polarizing plate arranged on an emission side of the optical element, and when light having wavelength components in the visible wavelength region, including at least a part of light having a first wavelength component in the visible wavelength region enters at least at a predetermined angle, the optical element provides a phase difference so as to shield the light of the first wavelength component so as not to pass through the emission-side polarizing plate, and at least one auxiliary light-shielding layer that comprises an optical element having a birefringence and at least one polarizing plate that comprises an emission-side polarizing plate arranged on the emission side of the optical element, and when the remaining light having wavelength components in the visible wavelength region not including the first wavelength component that has passed through the first light-shielding layer enters at least at the predetermined angle, the optical element provides a phase difference so as to shield at least the remaining light so as not to pass through the emission-side polarizing plate;

at least the wavelength components of the primary colors of light among the light beams entering the viewing angle control element at least at the predetermined angle are shielded by the first light-shielding layer and the auxiliary light-shielding layer.

* * * * *